(12) United States Patent
Nishikawa (10) Patent No.: US 11,456,644 B2
(45) Date of Patent: Sep. 27, 2022

(54) POWER GENERATING DEVICE

(71) Applicant: Tanaka Holdings Co., Ltd., Nagahama (JP)

(72) Inventor: Noritoshi Nishikawa, Shiga (JP)

(73) Assignee: Tanaka Holdings Co., Ltd., Shiga (JP)

( * ) Notice: Subject to any disclaimer, the term of this patent is extended or adjusted under 35 U.S.C. 154(b) by 0 days.

(21) Appl. No.: 17/276,012

(22) PCT Filed: Mar. 17, 2020

(86) PCT No.: PCT/JP2020/011834
§ 371 (c)(1),
(2) Date: Mar. 12, 2021

(87) PCT Pub. No.: WO2020/203270
PCT Pub. Date: Oct. 8, 2020

(65) Prior Publication Data
US 2022/0060086 A1 Feb. 24, 2022

(30) Foreign Application Priority Data
Mar. 29, 2019 (JP) .............................. JP2019-066113

(51) Int. Cl.
*H02K 7/18* (2006.01)
*F03B 3/08* (2006.01)

(52) U.S. Cl.
CPC ............ *H02K 7/1823* (2013.01); *F03B 3/08* (2013.01); *F05B 2220/706* (2013.01); *F05B 2240/60* (2013.01)

(58) Field of Classification Search
CPC ... H02K 7/1823; F03B 3/08; F05B 2220/706; F05B 2240/60
See application file for complete search history.

(56) References Cited

U.S. PATENT DOCUMENTS

| 3,611,723 A | * | 10/1971 | Theis, Jr. | ............... F03B 17/005 60/327 |
| 2014/0117669 A1 | * | 5/2014 | Kyle | ........................ F17D 1/04 290/50 |
| 2014/0186157 A1 | | 7/2014 | Murai | |

FOREIGN PATENT DOCUMENTS

| CN | 205677753 U | 11/2016 |
| GB | 2128259 A | 4/1984 |

(Continued)

OTHER PUBLICATIONS

International Search Report (ISR) dated Jun. 23, 2020 filed in PCT/JP2020/011834.

(Continued)

*Primary Examiner* — Joseph Ortega
(74) *Attorney, Agent, or Firm* — Rankin, Hill & Clark LLP (57) ABSTRACT

A power generating apparatus is provided which has a simple configuration with excellent maintainability and power generation efficiency. A power generating apparatus 100 includes an inlet pipe 101, a rotational coupling unit 102, a generator 110, and a rotating blade 120. The inlet pipe 101 is connected to a supply source of a liquid WK and guides the liquid WK to the rotational coupling unit 102. The rotational coupling unit 102 rotatably couples an input shaft 112 of the generator 110 to the inlet pipe 101. The input shaft 112 configures a rotor in the generator 110 and is formed into a pipe that conveys the liquid WK to a base pipe 121 of the rotating blade 120 to function as piping. The generator 110 generates electric power on the basis of rotary motion of the input shaft 112. The rotating blade 120 includes two arm pipes 123 on an outer side in a radial direction of the base pipe 121 formed into a pipe, and is rotationally driven by jetting the liquid WK along a circumferential direction of the (Continued)

base pipe 121 through a discharge tube 124 provided at a distal end portion of each of the arm pipes 123.

5 Claims, 9 Drawing Sheets

(56) References Cited

FOREIGN PATENT DOCUMENTS

JP          5204923 B1   6/2013
KR   10-2012-0004388 A   1/2012

OTHER PUBLICATIONS

Japanese Office Action (JOPA) dated Jul. 23, 2019 for the corresponding Japanese Patent Application No. 2019-066113 and its English trasnlation.
Japanese Office Action (JPOA) dated Nov. 19, 2019 for the corresponding Japanese Patent Application No. 2019-066113 and its English trasnlation.

\* cited by examiner

POWER GENERATING DEVICE

TECHNICAL FIELD

The present invention relates to a power generating apparatus that mainly converts the force of the flow of a liquid such as hydraulic power into electrical energy.

BACKGROUND ART

Various hydroelectric power generating apparatuses have conventionally been proposed. For example, Patent Literature 1 below discloses a hydroelectric power generating apparatus that generates electric power by rotating by hydropower a bottomed cylindrical casing configuring a runner floating in a water storage tank.

CITATION LIST

Patent Literature

PATENT LITERATURE 1: Japanese Patent No. 5204923

However, the configuration of the runner that rotates by hydropower in the hydroelectric power generating apparatus described in Patent Literature 1 above is complicated. Moreover, the power generating apparatus is installed in such a manner as to float in the water storage tank. Hence, there arises a problem that maintenance is difficult. In addition, there is concern about low power generation efficiency due to a loss during the rotation of the casing.

The present invention has been made to handle the above problems. An object thereof is to provide a power generating apparatus having excellent maintainability and power generation efficiency due to a simple configuration.

SUMMARY OF INVENTION

In order to achieve the object described above, a feature of the present invention is that there are included: an inlet pipe configured to receive and convey a liquid; a rotating blade including a base pipe constituted by a pipe body communicating with the inlet pipe, the rotating blade being configured to jet the liquid in a circumferential direction of the base pipe and rotate along the circumferential direction; a generator including an input shaft where a rotary drive force is inputted, the generator being configured to convert the rotary drive force into electrical energy; and a rotational coupling unit rotatably coupling the base pipe, directly or via the input shaft, to the inlet pipe. The generator generates electric power on the basis of the rotary drive of the base pipe connected to the input shaft, the input shaft is connected at one end portion to the rotational coupling unit, the input shaft is connected at the other end portion to the base pipe, and the generator is placed between the rotational coupling unit and the rotating blade.

According to the feature of the present invention configured in this manner, the power generating apparatus has a simple configuration where the generator is connected to the base pipe of the rotating blade that is rotationally driven by the force of a liquid jet. Hence, maintainability and power generation efficiency can be excellent. Water can be piped and supplied from a lake, a pond, a river, a dam, a water storage tank, a pool, or the like into the inlet pipe in the power generating apparatus. Moreover, according to the feature of the present invention, in the power generating apparatus, the one end portion of the input shaft provided in such a manner as to penetrate the generator is connected to the rotational coupling unit. In addition, the other end portion is connected to the base pipe. The generator is placed between the rotational coupling unit and the rotating blade. Hence, a simple apparatus configuration can be realized.

In order to achieve the object described above, a feature of the present invention is that there are included: an inlet pipe configured to receive and convey a liquid; a rotating blade including a base pipe constituted by a pipe body communicating with the inlet pipe, the rotating blade being configured to jet the liquid in a circumferential direction of the base pipe and rotate along the circumferential direction; a generator including an input shaft where a rotary drive force is inputted, the generator being configured to convert the rotary drive force into electrical energy; and a rotational coupling unit rotatably coupling the base pipe, directly or via the input shaft, to the inlet pipe. The generator generates electric power on the basis of the rotary drive of the base pipe connected to the input shaft, the rotational coupling unit includes: a tubular diameter-increasing portion formed into a tube that has an outside diameter increasing from a portion coupled to the base pipe or the input shaft toward a portion coupled to the inlet pipe; a tubular diameter-reducing portion formed into a tube that covers an outer peripheral surface of the tubular diameter-increasing portion via a tubular gap from the portion coupled to the inlet pipe and has a reducing inside diameter; and a tubular water passage constituted by the tubular gap between the outer peripheral surface of the tubular diameter-increasing portion and an inner peripheral surface of the tubular diameter-reducing portion, the tubular water passage being configured to communicate with an inside of the inlet pipe and an outside of the inlet pipe.

According to the feature of the present invention configured in this manner, the power generating apparatus has a simple configuration where the generator is connected to the base pipe of the rotating blade that is rotationally driven by the force of a liquid jet. Hence, maintainability and power generation efficiency can be excellent. Water can be piped and supplied from a lake, a pond, a river, a dam, a water storage tank, a pool, or the like into the inlet pipe in the power generating apparatus. Moreover, according to the feature of the present invention, the power generating apparatus is configured in such a manner that the rotational coupling unit includes the tubular water passage constituted by the tubular gap between the outer peripheral surface of the tubular diameter-increasing portion and the inner peripheral surface of the tubular diameter-reducing portion, the tubular water passage being configured to communicate with the inside of the inlet pipe and the outside of the inlet pipe. Consequently, in the power generating apparatus, the liquid supplied into the inlet pipe flows through the tubular water passage and accordingly the rotating blade can rotate smoothly with respect to the inlet pipe.

Further, another feature of the present invention is that, in the power generating apparatus, a tubular diameter-increasing portion is configured, including an inclined surface having gradually increasing outside and inside diameters, and the tubular diameter-increasing portion and an inlet pipe are formed in such a manner that distal end portions thereof are capable of coming into contact face-to-face with each other.

According to the other feature of the present invention configured in this manner, the power generating apparatus is configured, including the inclined surface where the outside and inside diameters of the tubular diameter-increasing portion increase gradually. In addition, the tubular diameter-increasing portion and the inlet pipe are formed in such a manner that the distal end portions can come into contact face-to-face with each other. Hence, the supply of the liquid from the inlet pipe, or a stoppage of the supply, allows the rotating blade or the input shaft to move away from, or come into contact with, the inlet pipe. Consequently, the power generating apparatus can guide the liquid supplied from the inlet pipe to the tubular water passage. In addition, when the supply of the liquid from the inlet pipe stops, it is possible to prevent the tubular diameter-increasing portion and also the base pipe of the rotating blade from entering the inlet pipe.

Further, still another feature of the present invention is that, in a power generating apparatus, a rotating blade is configured in such a manner that an outlet through which a liquid is discharged is inclined toward a rotational coupling unit with respect to a surface of revolution of the rotating blade.

According to the other feature of the present invention configured in this manner, in the power generating apparatus, the outlet of the rotating blade through which the liquid is discharged is inclined toward the rotational coupling unit with respect to the surface of revolution of the rotating blade in the power generating apparatus. Hence, the liquid is discharged from the rotating blade to allow the rotating blade to effectively move away from the inlet pipe. It is possible to effectively guide the liquid supplied from the inlet pipe to the tubular water passage.

Further, in order to achieve the object described above, a feature of the present invention is that there are included: an inlet pipe configured to receive and convey a liquid; a rotating blade including a base pipe constituted by a pipe body communicating with the inlet pipe, the rotating blade being configured to jet the liquid in a circumferential direction of the base pipe and rotate along the circumferential direction; a generator including an input shaft where a rotary drive force is inputted, the generator being configured to convert the rotary drive force into electrical energy; and a rotational coupling unit rotatably coupling the base pipe, directly or via the input shaft, to the inlet pipe. The generator generates electric power on the basis of the rotary drive of the base pipe connected to the input shaft, the rotating blade includes an arm pipe constituted by at least one pipe body extending in a radial direction of the base pipe, the arm pipe being configured to jet the liquid in the circumferential direction of the base pipe and rotate along the circumferential direction, and a gutter- or groove-shaped liquid jet receiver extending annularly along a rotation path of the liquid jetted from the arm pipe below the rotation path is provided below the arm pipe.

According to the feature of the present invention configured in this manner, the power generating apparatus has a simple configuration including the generator connected to the base pipe of the rotating blade that is rotationally driven by the force of a liquid jet. Hence, maintainability and power generation efficiency can be made excellent. Moreover, the power generating apparatus includes the arm pipe configured to jet the liquid in the circumferential direction of the base pipe and rotate along the circumferential direction. In addition, the gutter- or groove-shaped liquid jet receiver extending annularly along the rotation path of the jetted liquid is provided below the arm pipe. Hence, it is possible to efficiently collect the liquid while preventing the jetted liquid from splashing. Water can be piped and supplied from a lake, a pond, a river, a dam, a water storage tank, a pool, or the like into the inlet pipe in the power generating apparatus.

Moreover, in the present invention, in the power generating apparatus, the rotating blade can include the arm pipe constituted by at least one pipe body extending in the radial direction of the base pipe, the arm pipe being configured to jet the liquid in the circumferential direction of the base pipe and rotate along the circumferential direction.

According to this, in the power generating apparatus, the rotating blade includes the arm pipe constituted by at least one pipe body extending in the radial direction of the base pipe, the arm pipe being configured to jet the liquid in the circumferential direction of the base pipe and rotate along the circumferential direction. Hence, a large rotary drive force can be applied to the base pipe. Accordingly, power generation efficiency can be improved. In this case, the power generating apparatus may include two arm pipes constituted by at least two pipe bodies extending in the radial direction of the base pipe.

Moreover, in the power generating apparatus according to the present invention, one end portion of the base pipe of the rotating blade is connected to the rotational coupling unit. In addition, the other end portion is connected to the input shaft of the generator. In this manner, the generator can be placed on a side opposite to the rotational coupling unit across the rotating blade.

According to this, in the power generating apparatus, the one end portion of the base pipe of the rotating blade is connected to the rotational coupling unit. In addition, the other end portion is connected to the input shaft of the generator. In this manner, the generator is placed on the side opposite to the rotational coupling unit across the rotating blade. Hence, it is possible to avoid the flow of the liquid guided to the rotating blade in the generator. Accordingly, it is possible to constitute maintainability.

Moreover, in the power generating apparatus according to the present invention, the generator can be provided in such a manner that the input shaft is in a horizontal position, or in a position extending above the rotating blade.

According to this, in the power generating apparatus, the generator is provided in such a manner that the input shaft of the generator is in the horizontal position, or in the position extending above the rotating blade. Hence, it is possible to prevent the liquid jetted from the rotating blade from adhering to the generator. Accordingly, it is possible to enhance the simplification and longevity of the apparatus configuration.

Moreover, the power generating apparatus according to the present invention can further include a collection tank that covers around the rotating blade and collects the liquid jetted from the rotating blade.

According to this, the power generating apparatus includes the collection tank that covers around the rotating blade and collects the liquid jetted from the rotating blade. Hence, it is possible to prevent the liquid jetted from the rotating blade from splashing. In addition, it is possible to easily reuse the collected liquid.

DESCRIPTION OF EMBODIMENTS

Figure 1:
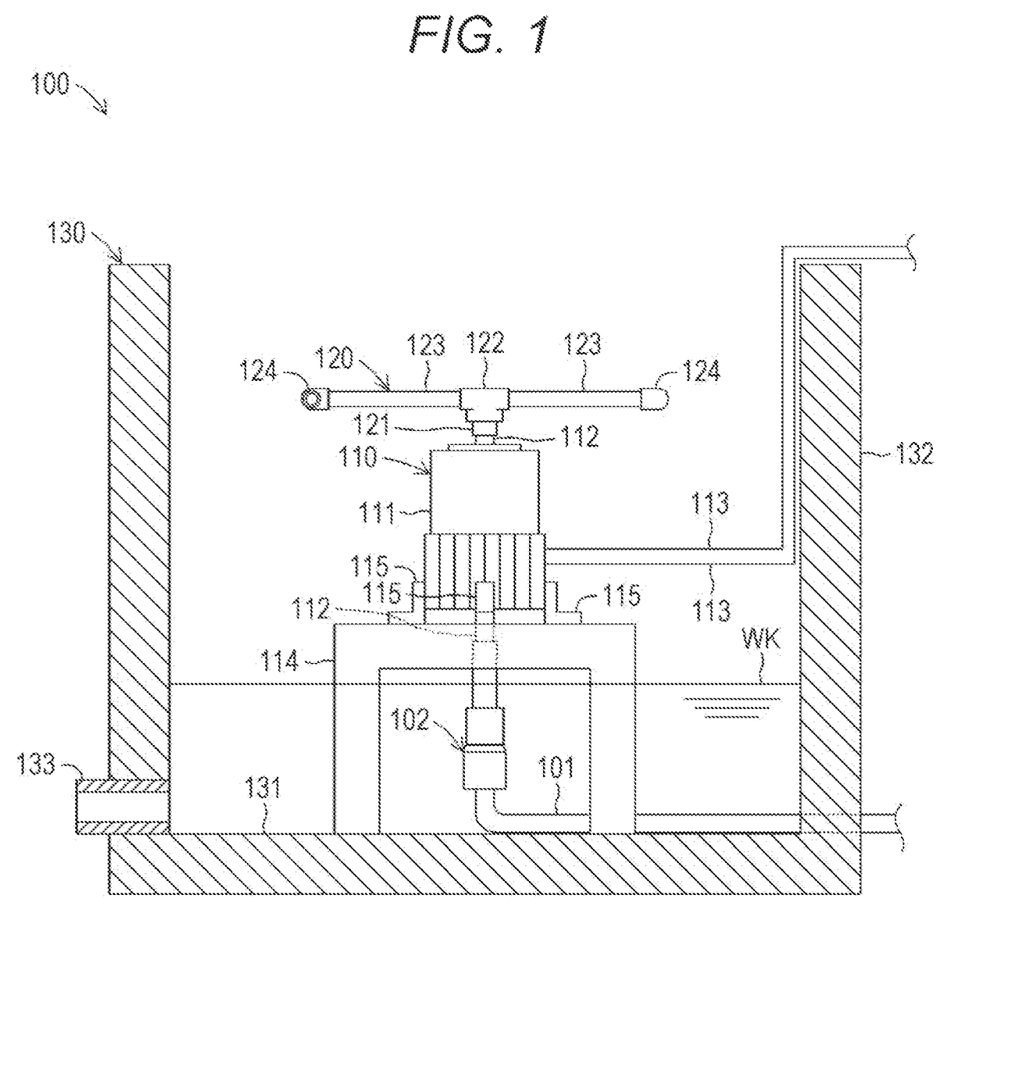
FIG. 1 is a cross-sectional view schematically illustrating a diagrammatic sketch of the external configuration of a power generating apparatus according to the present invention.
Figure 2:
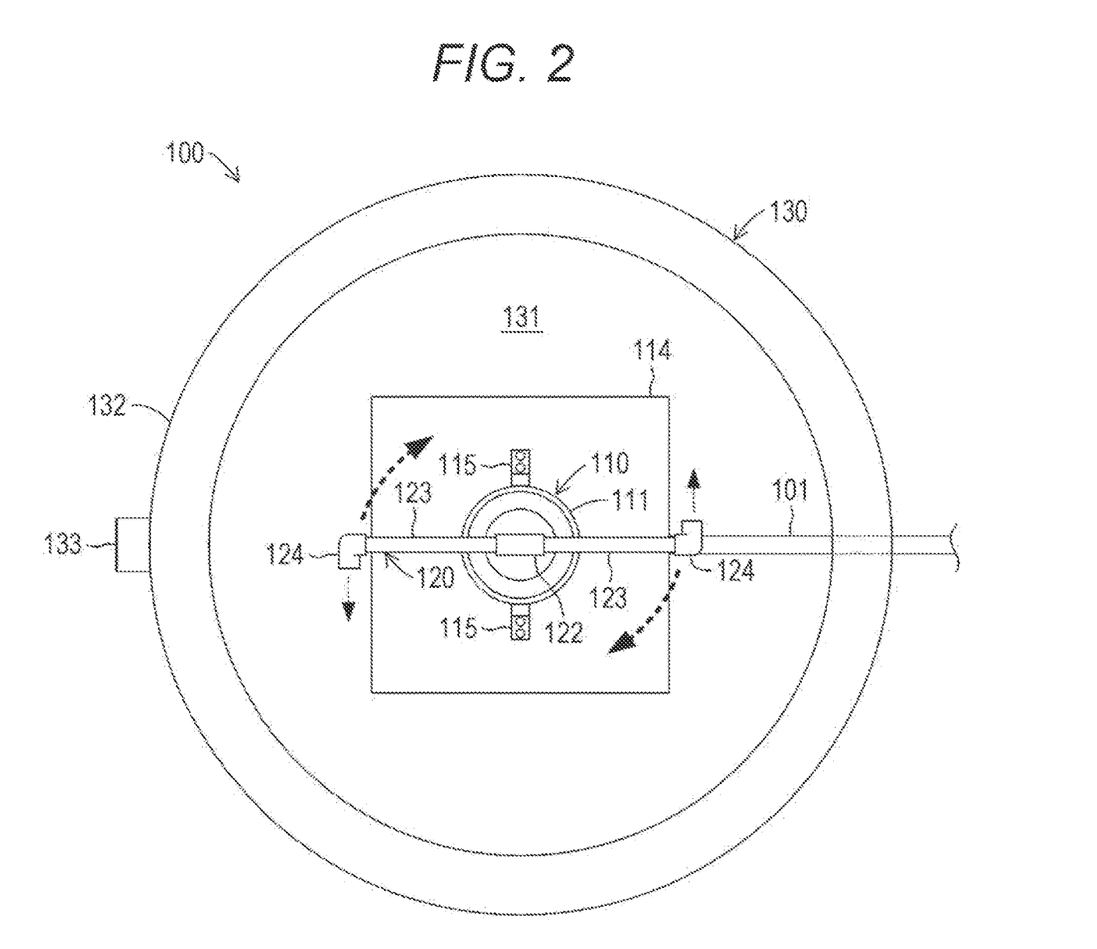
FIG. 2 is a plan view schematically illustrating a diagrammatic sketch of the external configuration of the power generating apparatus illustrated in FIG. 1.

One embodiment of a power generating apparatus according to the present invention is described hereinafter with reference to the drawings. FIG. 1 is a cross-sectional view schematically illustrating a diagrammatic sketch of the external configuration of a power generating apparatus 100 according to the present invention. Moreover, FIG. 2 is a plan view schematically illustrating a diagrammatic sketch of the external configuration of the power generating apparatus 100 illustrated in FIG. 1. Each drawing referred to in the description schematically illustrates a part of constituent elements by, for example, exaggerating them for the purpose of easy understanding of the present invention. Hence, for example, the dimension or ratio between the constituent elements may be different. The power generating apparatus 100 is an apparatus that generates electric power, using, as motive power, the power of water piped from a water supply source such as a lake, a pond, a river, a dam, a water storage tank, or a pool. In this case, a supply source where kinetic energy based on a flow created by falling water can be obtained, that is, a supply source that stores water having potential energy, can be used as the water supply source.
(Configuration of Power Generating Apparatus 100)

The power generating apparatus 100 includes an inlet pipe 101. The inlet pipe 101 is a component that forms a water passage for guiding a liquid WK piped from an unillustrated water supply source such as a dam or reservoir to a rotating blade 120. The inlet pipe 101 is constituted by a pipe body obtained by forming a metal or resin material into a cylindrical shape. In the embodiment, the inlet pipe 101 is constituted by a steel pipe material. The inlet pipe 101 is provided in such a manner as to penetrate a side surface 132 standing around a bottom portion 131 of a collection tank 130 described below. One (right in the drawing) end portion thereof is linked to an intake pipe of a dam or reservoir. In addition, the other (left in the drawing) end portion is connected to a rotational coupling unit 102 in the collection tank 130.

Figure 3:
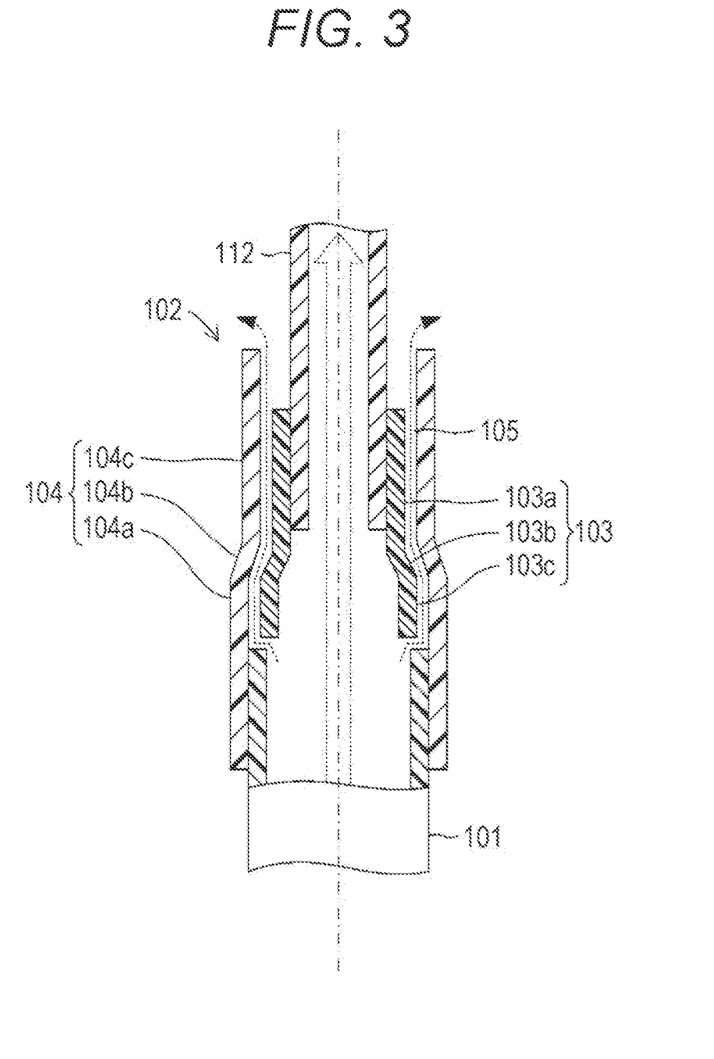
FIG. 3 is a cross-sectional view schematically illustrating the internal structure of a rotational coupling unit in the power generating apparatus illustrated in FIG. 1.

As illustrated in FIG. 3, the rotational coupling unit 102 is a portion that rotatably couples the rotating blade 120 to the inlet pipe 101 via an input shaft 112 of a generator 110. The rotational coupling unit 102 is configured, mainly including a tubular diameter-increasing portion 103, a tubular diameter-reducing portion 104, and a tubular water passage 105. The tubular diameter-increasing portion 103 is a component that is attached to a distal end portion of the input shaft 112 extending from the generator 110 and forms the tubular water passage 105. The tubular diameter-increasing portion 103 is configured by forming a metal or resin material into a cylindrical shape. More specifically, the tubular diameter-increasing portion 103 is configured, including a fitting portion 103a, an inclined surface 103b, and an opposing portion 103c.

The fitting portion 103a is a portion that is fitted to the outside of the distal end portion of the input shaft 112 of the generator 110. The fitting portion 103a is formed into a cylindrical shape extending straight. In this case, the fitting portion 103a is fixed with an adhesive to the distal end portion of the input shaft 112 of the generator 110. The inclined surface 103b is a tapered portion. The outside and inside diameters of the inclined surface 103b increase gradually as compared to the outside and inside diameters of the input shaft 112 of the generator 110.

The opposing portion 103c is formed into a cylindrical shape that has a maximum outside diameter of the inclined surface 103b where the diameter increases and that extends straight. The opposing portion 103c is formed into a size and thickness that allows the opposing portion 103c to come into contact with a distal end portion of the inlet pipe 101. In the embodiment, the opposing portion 103c is formed in such a manner as to have a slightly smaller outside diameter than the outside diameter of the inlet pipe 101. The tubular diameter-increasing portion 103 may be formed integrally with the distal end portion of the input shaft 112 of the generator 110.

The tubular diameter-reducing portion 104 is attached to the distal end portion of the inlet pipe 101. The tubular diameter-reducing portion 104 is a component that forms the tubular water passage 105. The tubular diameter-reducing portion 104 is constituted by a metal or resin material formed into a cylindrical shape. More specifically, the tubular diameter-reducing portion 104 is configured, including a fitting portion 104a, an inclined surface 104b, and an outflow portion 104c, which are formed in such a manner as to have a size that allows covering an outer peripheral surface of the tubular diameter-increasing portion 103 via a gap.

The fitting portion 104a is a portion that is fitted to the outside of the distal end portion of the inlet pipe 101. The fitting portion 104a is formed into a cylindrical shape extending straight. In this case, the fitting portion 104a is fixed with an adhesive to the distal end portion of the inlet pipe 101. The fitting portion 104a is formed in such a manner as to have a length sufficient to cover the opposing portion 103c of the tubular diameter-increasing portion 103.

The inclined surface 104b is a tapered portion. The outside and inside diameters of the fitting portion 104a reduce gradually in the inclined surface 104b. In this case, the inclined surface 104b may be formed in such a manner as to have the same angle of inclination as the inclined surface 103b of the tubular diameter-increasing portion 103. However, if they are formed in such a manner as to have different angles of inclination from each other, it is possible to prevent them from coming into intimate contact with each other. The tubular water passage 105 can be easily formed.

The outflow portion 104c is a portion for stably rotating the rotating blade 120. The outflow portion 104c has a minimum inside diameter of the inclined surface 103b where the diameter reduces. Furthermore, the outflow portion 104c is formed in such a manner as to have a straight cylindrical shape extending parallel to the fitting portion 103a. In this case, the outflow portion 104c is formed in such a manner as to have a length sufficient to jut out from an illustrated upper end portion of the fitting portion 103a.

The tubular water passage 105 forms a water passage for causing a part of the liquid WK guided into the inlet pipe 101 to escape to the outside. This allows the tubular diameter-increasing portion 103 and the tubular diameter-reducing portion 104 to rotate relative to each other. The tubular water passage 105 is formed by a cylindrical gap between the outer peripheral surface of the tubular diameter-increasing portion 103 and an inner peripheral surface of the tubular diameter-reducing portion 104. In the embodiment, the gap forming the tubular water passage 105 is set at 2 mm between the outer peripheral surface of the tubular diameter-increasing portion 103 and the inner peripheral surface of the tubular diameter-reducing portion 104. The flow of the liquid WK is indicated by a dashed-line arrow in FIG. 3.

Here, a method for assembling the rotational coupling unit 102 is briefly described. Firstly, a worker passes an illustrated lower end portion of the input shaft 112 of the generator 110 into the tubular diameter-reducing portion 104 in advance. The illustrated lower end portion of the input shaft 112 is then passed into the fitting portion 103a of the tubular diameter-increasing portion 103 to be bonded and fixed thereto. Next, the worker locates the tubular diameter-reducing portion 104 into which the input shaft 112 has been passed, outside the tubular diameter-increasing portion 103. In addition, the fitting portion 104a is bonded and fixed to the distal end portion of the inlet pipe 101. Consequently, the rotational coupling unit 102 can be assembled.

The generator 110 is a mechanical apparatus for obtaining electrical energy from mechanical energy based on rotary motion. The generator 110 is configured, mainly including a generator body 111 and the input shaft 112. The generator body 111 is a component that rotatably holds the input shaft 112 and generates electric power. The generator 110 is configured, including an unillustrated stator in a cylindrical housing. Moreover, output wiring 113 that takes out electricity generated by the generator 110 extends from a side surface of the generator body 111 to the outside of the collection tank. In FIG. 2, the illustration of the output wiring 113 is omitted (the same shall also apply in FIG. 9 described below).

Rotary motion is inputted onto the input shaft 112 from the outside. Consequently, the input shaft 112 functions as a rotor. In addition, the input shaft 112 configures a water passage that guides the liquid WK guided from the rotational coupling unit 102 to a base pipe 121 of the rotating blade 120. The input shaft 112 is configured, including an unillustrated iron core, winding, and cooling fan in a main shaft. The input shaft 112 penetrates through the generator body 111. Moreover, the input shaft 112 is rotatably held by the generator body 111 via an unillustrated bearing in such a manner that both end portions of the input shaft 112 jut out of the generator body 111. In this case, on the input shaft 112, the bearing is sandwiched between elastic bushings (not illustrated) provided on both sides of the input shaft 112 in an axial direction thereof, which allows the input shaft 112 to be held in such a manner as to be slightly displaceable to and fro in the axial direction with respect to the generator body 111.

Moreover, the main shaft configuring the input shaft 112 is formed into a cylindrical shape. The main shaft penetrates through the generator body 111. Furthermore, the main shaft is rotatably held by the generator body 111 in such a manner that both end portions of the main shaft jut out of the generator body 111. One of both end portions of the input shaft 112 is coupled to the tubular diameter-increasing portion 103 of the rotational coupling unit 102. In addition, the other end portion is coupled to the base pipe 121 of the rotating blade 120. In other words, the input shaft 112 guides the liquid WK supplied from the inlet pipe 101 to the rotating blade 120.

The generator 110 is supported on a support base 114 installed on the bottom portion 131 of the collection tank 130. The support base 114 is a component that supports the generator 110 fixedly in the collection tank. The support base 114 is constituted by a metal material formed into a four-legged table shape. An unillustrated through-hole is formed at a center portion of a generator-110 mounting surface of the support base 114. The generator 110 is mounted in such a manner that one end portion of the input shaft 112 penetrates the generator 110 through the through-hole. In this case, the generator 110 is fixedly attached with fasteners 115 (four fasteners in the embodiment) to an upper surface of the support base 114. The power generation performance of the generator 110 is determined as appropriate, depending on, for example, the amount of supply of the liquid WK.

The rotating blade 120 discharges the liquid WK supplied from the inlet pipe 101. This allows the rotating blade 120 to be rotationally driven. Moreover, the rotating blade 120 is constituted by a metal or resin pipe body. The rotating blade 120 is configured, mainly including the base pipe 121, a branch tube 122, and arm pipes 123.

The base pipe 121 supports the rotating blade 120. In addition, the base pipe 121 guides the liquid WK guided from the inlet pipe 101 to the rotating blade 120 itself via the rotational coupling unit 102. Moreover, the base pipe 121 is constituted by a cylindrical metal body extending straight in the vertical direction. One (lower in the drawing) end portion of the base pipe 121 is connected to the input shaft 112 of the generator 110. In addition, the other (upper in the drawing) end portion is connected to the branch tube 122.

The branch tube 122 causes the liquid WK guided from the base pipe 121 to branch into two directions. The branch tube 122 is a metal component. Moreover, the branch tube 122 is formed into a T-shape linked to one water passage extending straight in a direction orthogonal to an axial direction of the base pipe 121. The branch tube 122 is connected to two arm pipes 123 in the direction orthogonal to the axial direction of the base pipe 121.

Each of the two arm pipes 123 is a component that guides the liquid WK guided from the branch tube 122 outward in a radial direction of the base pipe 121. The two arm pipes 123 are each constituted by a cylindrical metal pipe body extending straight in the horizontal direction. In this case, the two arm pipes 123 are formed in such a manner as to have the same length and the same inside and outside diameters as each other in the embodiment. However, both may be formed in such a manner as to have different lengths and/or different inside and outside diameters from each other. Moreover, the two arm pipes 123 are provided on the same axis as each other (that is, on a straight line) in the embodiment. However, central axes thereof may be provided at different positions from each other. A discharge tube 124 is provided to a distal end portion of each of the two arm pipes 123.

The two discharge tubes 124 jet the liquid WK guided from the arm pipes 123 toward a circumferential direction of the base pipe 121 (or a tangential direction to the circumferential direction) in such a manner that the rotating blade 120 rotates. The discharge tube 124 is a metal component. Moreover, the discharge tube 124 is constituted by a substantially L-shaped cylindrical body bent in a direction orthogonal to an axial direction of the arm pipe 123. In this case, an outlet, through which the liquid WK is discharged, of each discharge tube 124 is provided, oriented parallel to the horizontal circumferential direction of the base pipe 121.

The collection tank 130 prevents the liquid WK jetted from the rotating blade 120 from splashing around. In addition, the collection tank 130 collects the liquid WK. Moreover, the collection tank 130 is a concrete structure, and is formed into a bottomed cylindrical shape. The generator 110 and the rotating blade 120 are provided at a center portion of the bottom portion 131 of the collection tank 130 via the support base 114. Moreover, the inlet pipe 101 is provided to a lower portion of the side surface 132 of the collection tank 130, penetrating therethrough. In addition, a drain pipe 133 is provided on a side opposite to the inlet pipe 101, penetrating therethrough.

Moreover, the collection tank 130 is formed in such a manner as to cover around the rotating blade 120 and in such a manner as to have a depth sufficient to collect the liquid WK jetted from the rotating blade 120 and prevent the liquid WK from splashing. Moreover, in the embodiment, the collection tank 130 is formed in such a manner as to be open above the rotating blade 120. However, a closed structure including a ceiling that covers the open portion can also be configured.

(Operation of Power Generating Apparatus 100)

Next, the operation of the power generating apparatus 100 configured in this manner is described. Firstly, a worker connects the inlet pipe 101 of the power generating apparatus 100 to piping (not illustrated) that guides water from a water supply source such as a dam or reservoir. In addition, the worker electrically connects the output wiring 113 of the generator 110 to a supply destination of electric power generated by the power generating apparatus 100.

Figure 4:
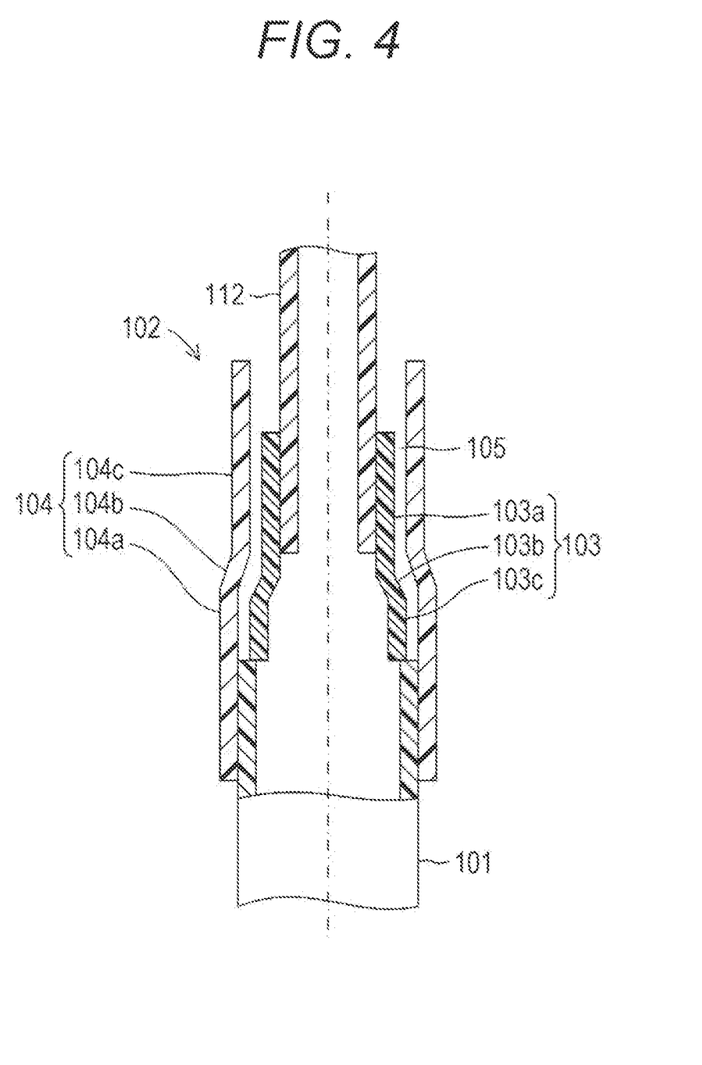
FIG. 4 is a cross-sectional view schematically illustrating a state where a liquid is not supplied into the rotational coupling unit illustrated in FIG. 3.

In this case, as illustrated in FIG. 4, the tubular diameter-increasing portion 103 is mounted on an upper end portion of the inlet pipe 101 under the weights of the rotating blade 120 and the input shaft 112 in the rotational coupling unit 102 in the power generating apparatus 100. In other words, a water passage inside the inlet pipe 101 is blocked in the tubular water passage 105.

Next, the worker opens a valve (not illustrated) provided on the piping extending from the supply source that supplies water to the power generating apparatus 100 to supply the water to the power generating apparatus 100. Consequently, the water flows into the inlet pipe 101 in the power generating apparatus 100. A part of the liquid WK supplied into the inlet pipe 101 comes into contact with the inclined surface 103b of the tubular diameter-increasing portion 103 of the rotational coupling unit 102 to press the entire tubular diameter-increasing portion 103 upward.

Consequently, the tubular diameter-increasing portion 103 moves away from the distal end portion (the upper end portion illustrated) of the inlet pipe 101 and floats. Hence, the water passage inside the inlet pipe 101 and the tubular water passage 105 communicate with each other (refer to FIG. 3). Therefore, a part of the liquid WK flowing through the inlet pipe 101 is guided to the tubular water passage 105. The floating of the tubular diameter-increasing portion 103 indicates that the input shaft 112 and the rotating blade 120 are also displaced upward since the tubular diameter-increasing portion 103 is coupled to the rotating blade 120 via the input shaft 112. In other words, the reciprocating displacement amount of the input shaft 112 in the axial direction in the generator 110 corresponds to the floating displacement amount of the tubular diameter-increasing portion 103.

The liquid WK guided into the tubular water passage 105 flows upward through the tubular water passage 105 as illustrated, and then flows out of the outflow portion 104c (refer to the dashed-line arrow in FIG. 3). Consequently, the tubular diameter-increasing portion 103 is prevented from coming into direct contact with the tubular diameter-reducing portion 104. Hence, the tubular diameter-increasing portion 103 is rotatable with respect to the tubular diameter-reducing portion 104. Moreover, the liquid WK that has pressed the tubular diameter-increasing portion 103 upward flows into the base pipe 121 through the input shaft 112. Apart of the liquid WK then flows into one of the two arm pipes 123 through the branch tube 122. In addition, the other part flows into the other of the two arm pipes 123.

The liquid WK that has flown through the two arm pipes 123 is jetted in a concentric circumferential direction of the base pipe 121 from the discharge tubes 124 (refer to a narrow dashed-line arrow in FIG. 2). Consequently, the rotating blade 120 rotates about the base pipe 121 while jetting the liquid WK (refer to a thick dashed-line arrow in FIG. 2). In this case, the base pipe 121 is coupled to the input shaft 112 of the generator 110 so that the rotating blade 120 rotationally drives the input shaft 112 in the same direction as the rotation direction of the rotating blade 120 and at the same number of rotations. Consequently, the generator 110 starts generating electric power. In this case, the generator 110 continues generating electric power while rotating by the water supplied to the rotating blade 120. In other words, the worker can generate electric power by supplying water to the inlet pipe 101.

On the other hand, the liquid WK jetted from the two discharge tubes 124 of the rotating blade 120 is guided directly, or via the side surface 132, to the bottom portion 131 in the collection tank 130. The liquid WK is then drained from the collection tank 130 through the drain pipe 133.

Next, if the power generation is interrupted, the worker closes the valve provided on the piping extending from the supply source that supplies water to the power generating apparatus 100, and shuts off the supply of water to the power generating apparatus 100. Consequently, in the power generating apparatus 100, each section of the tubular diameter-increasing portion 103 moves down and comes into contact with the inlet pipe 101. Consequently, the communication state of them and the tubular water passage 105 is cut off to stop the rotation of the rotating blade 120. In this manner, the power generation is stopped.

As can be understood from the above operational description, according to the above embodiment, the power generating apparatus 100 has a simple configuration including the generator 110 connected to the base pipe 121 of the rotating blade 120 that is rotationally driven by the force of a jet of the liquid WK. Hence, maintainability and power generation efficiency can be made excellent.

Furthermore, carrying out the present invention is not limited to each of the above embodiments. Various modifications can be made without departing from the object of the present invention. In the following modifications, the same reference signs are assigned to constituent portions similar to the above embodiments. Descriptions thereof are omitted.

Figure 5:
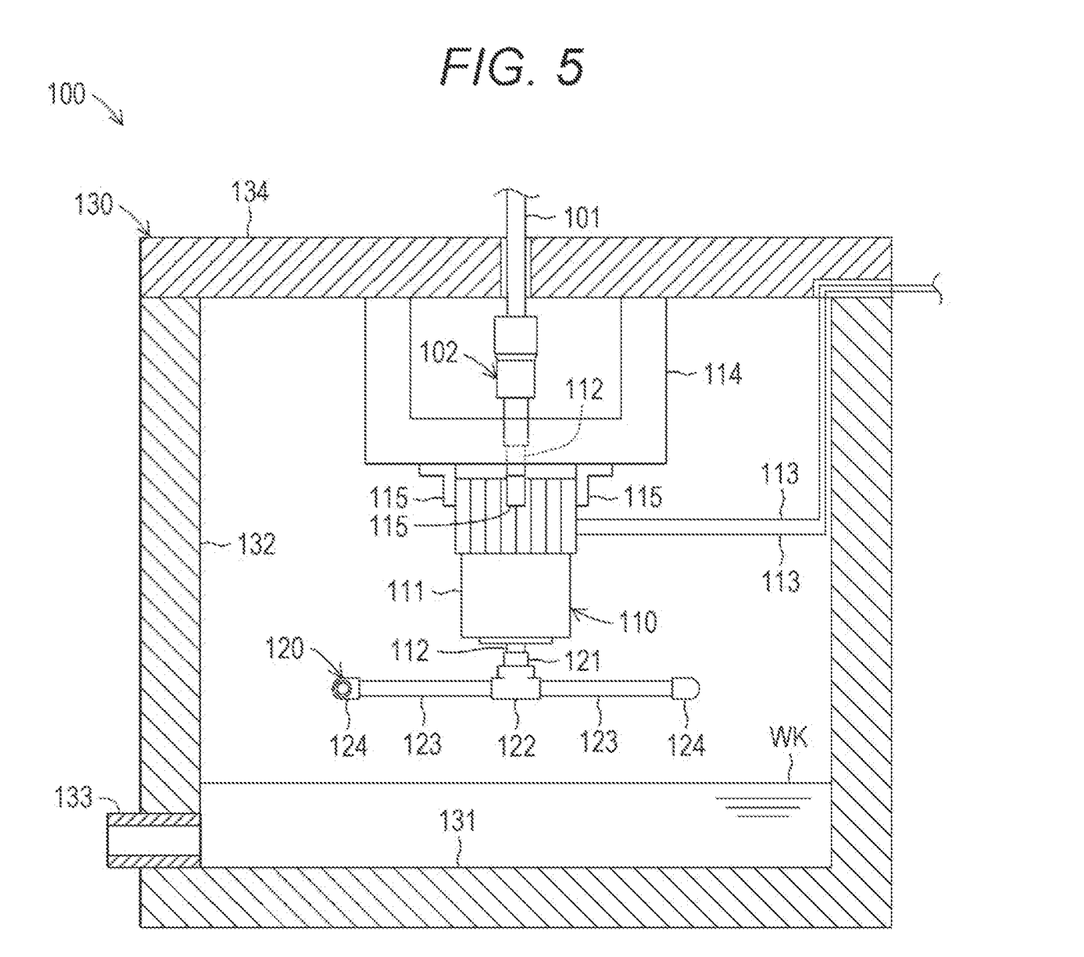
FIG. 5 is a cross-sectional view schematically illustrating a diagrammatic sketch of the external configuration of a power generating apparatus according to a modification of the present invention.

For example, in each of the above embodiments, the power generating apparatus 100 is placed on the bottom portion 131 of the collection tank 130. The power generating apparatus 100 is installed in such a manner that the base pipe 121 extends in the depth direction of the collection tank 130. However, the power generating apparatus 100 can be placed in various manners in the collection tank 130. For example, in terms of the power generating apparatus 100, it is also possible to provide the entire power generating apparatus 100 upside down as compared to the above embodiment as illustrated in FIG. 5. In this case, the generator 110 is attached to a lower surface of a ceiling 134 provided to the collection tank 130. Consequently, the rotating blade 120 is located below the generator 110 in the power generating apparatus 100. Hence, it is possible to prevent the liquid WK jetted from the rotating blade 120 from adhering to the generator 110.

Moreover, it is also possible to provide the power generating apparatus 100 to the side surface 132 of the collection tank 130 as in the above, but an illustration thereof is omitted. In other words, it is also possible to provide the input shaft 112 in a horizontal direction, and the entire power generating apparatus 100 in a horizontal position. In this manner, in the power generating apparatus 100, the generator 110 can be provided in such a manner that the input shaft 112 of the generator 110 is in a horizontal position, or in such a manner that the input shaft 112 is in a position extending above the rotating blade 120. Consequently, it is possible to prevent the liquid WK jetted from the rotating blade 120 from adhering to the generator 110. Hence, it is possible to enhance the simplification and longevity of the apparatus configuration.

Moreover, the power generating apparatus 100 of the above embodiment is configured in such a manner that the rotational coupling unit 102 is coupled to the generator 110, and the generator 110 is coupled to the rotating blade 120. In other words, the power generating apparatus 100 is configured, coupling the rotating blade 120 to the rotational coupling unit 102 via the generator 110.

Figure 6:
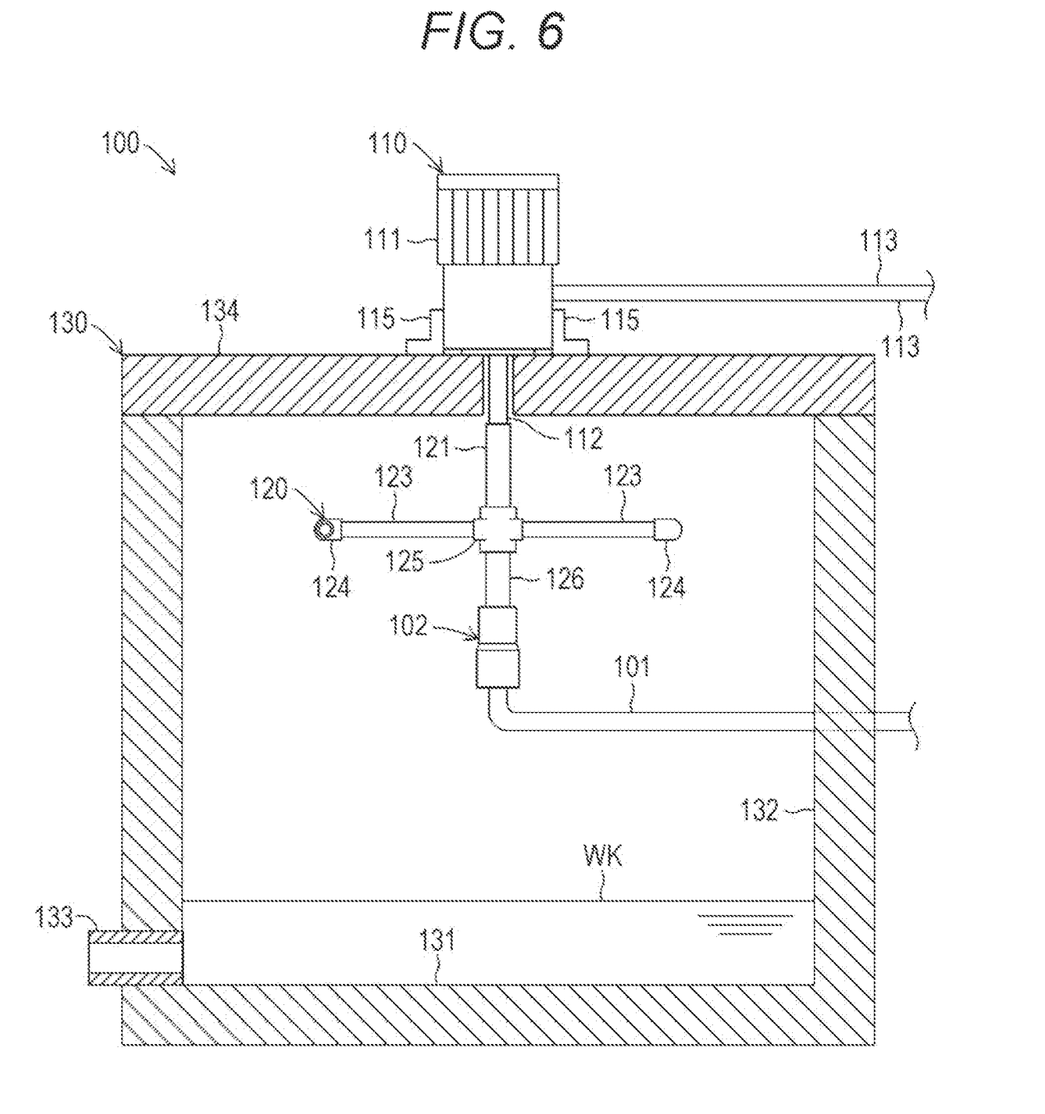
FIG. 6 is a cross-sectional view schematically illustrating a diagrammatic sketch of the external configuration of a power generating apparatus according to another modification of the present invention.

However, as illustrated in FIG. 6, the power generating apparatus 100 may be configured in such a manner that the rotational coupling unit 102 is coupled to the rotating blade 120, and the rotating blade 120 is coupled to the generator 110. In this case, the installed generator 110 is attached to an upper surface of the ceiling 134 provided to the collection tank 130. In addition, the input shaft 112 penetrates the ceiling 134. Moreover, the rotating blade 120 uses a branch tube 125 including water passages crossing at right angles, instead of the T-shaped branch tube 122. In addition, the branch tube 125 is connected to a base pipe 126 separate from and similar to the base pipe 121. The power generating apparatus 100 is configured in such a manner that the input shaft 112 protruding from the lower surface of the ceiling 134 and the base pipe 126 are connected to each other, and the rotating blade 120 and the generator 110 are coupled to each other.

According to this, in the power generating apparatus 100, one end portion of the base pipe 126 of the rotating blade 120 is connected to the rotational coupling unit 102. In addition, the other end portion is connected to the input shaft 112 of the generator 110 via the branch tube 125 and the base pipe 121. Consequently, the generator 110 is placed on a side opposite to the rotational coupling unit 102 across the rotating blade 120. Hence, it is possible to avoid the flow of the liquid WK guided to the rotating blade 120 in the generator 110 and constitute maintainability. In this case, the input shaft 112 can be constituted by a solid shaft body since it is not necessary to cause the liquid WK to flow therethrough.

Moreover, in the above embodiment, the discharge tube 124 is provided in such a manner that the outlet through which the liquid WK is discharged is oriented parallel to the horizontal circumferential direction of the base pipe 121. Consequently, the power generating apparatus 100 can efficiently and rotationally drive the rotating blade 120. However, it is also possible to provide the discharge tube 124 in such a manner as to be open obliquely downward with respect to the surface of revolution of the rotating blade 120. According to this, in the power generating apparatus 100, the outlet, through which the liquid WK is discharged, of the rotating blade 120 is inclined toward the rotational coupling unit 102 with respect to the surface of revolution of the rotating blade 120. Hence, the discharge of the liquid WK from the rotating blade 120 allows the rotating blade 120 to effectively move away from the inlet pipe 101. In this manner, it is possible to effectively guide the liquid WK supplied from the inlet pipe 101, to the tubular water passage 105.

Moreover, the power generating apparatus 100 of the above embodiment is configured, including the two arm pipes 123 extending to both sides for the base pipe 121. However, the power generating apparatus 100 can be configured, including one or more arm pipes 123 for the base pipe 121. In this case, the generator 110 can also be configured, further including the arm pipe 123 on the axial direction side of the base pipe 121 (the vertical direction side in the drawings) for the one or more arm pipes 123 provided.

Moreover, in the above embodiment, the rotating blade 120 is configured, including the arm pipes 123. However, the rotating blade 120 is simply required to be configured in such a manner as to be rotationally driven by jetting the liquid WK. Therefore, the rotating blade 120 can also be configured in such a manner as to, for example, provide an outlet of the liquid WK that is open in a tangential direction to an outer peripheral surface of the base pipe 121.

Moreover, in the above embodiment, the power generating apparatus 100 is configured, including the rotational coupling unit 102, to rotatably couple the input shaft 112 of the generator 110 to the inlet pipe 101. However, it is simply required to rotatably couple the input shaft 112 of the generator 110, or the base pipe 121 of the rotating blade 120, to the inlet pipe 101 in the power generating apparatus 100. Therefore, the power generating apparatus 100 may be configured in such a manner that the input shaft 112 of the generator 110, or the base pipe 121 of the rotating blade 120, is rotatably coupled to the inlet pipe 101 via a bearing. In other words, the power generating apparatus 100 can be configured, omitting the rotational coupling unit 102.

Moreover, in the above embodiment, it is configured in such a manner that the tubular diameter-increasing portion 103 and the tubular diameter-reducing portion 104 of the rotational coupling unit 102 include the inclined surfaces 103b and 104b, respectively. However, the tubular diameter-increasing portion 103 and the tubular diameter-reducing portion 104 may be formed in such a manner as to have stepped shapes including an inside and an outside diameter that change stepwise, respectively between the fitting portion 103a and the opposing portion 103c and between the fitting portion 104a and the outflow portion 104c. In this manner, it is also possible to configure the tubular diameter-increasing portion 103 and the tubular diameter-reducing portion 104, omitting the inclined surfaces 103b and 104b.

Figure 7:
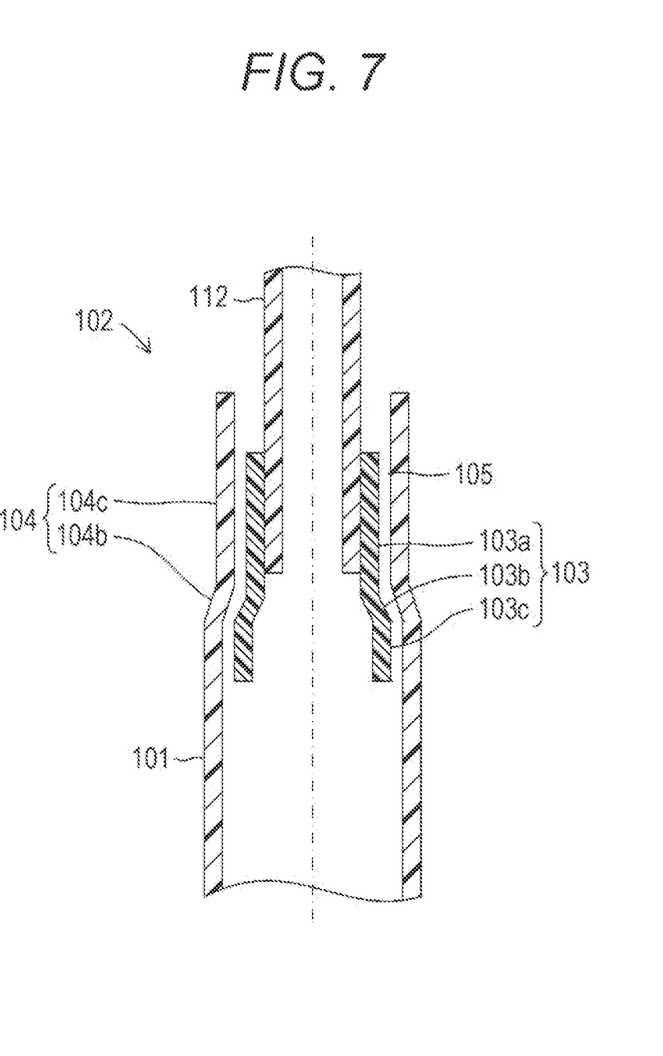
FIG. 7 is a cross-sectional view schematically illustrating the internal structure of a rotational coupling unit according to another modification of the present invention.

Moreover, in the above embodiment, the rotational coupling unit 102 is configured in such a manner that the tubular diameter-increasing portion 103 comes into contact with the distal end portion of the inlet pipe 101. However, it is also possible to configure the rotational coupling unit 102 in such a manner that the tubular diameter-increasing portion 103 does not come into contact with the distal end of the inlet pipe 101. For example, the rotational coupling unit 102 can be configured in such a manner that the inlet pipe 101 extends integrally from an illustrated lower end portion of the inclined surface 104b of the tubular diameter-reducing portion 104 as illustrated in FIG. 7. In this case, in a stopped state where the liquid WK is not supplied to the power generating apparatus 100, the input shaft 112 and the rotating blade 120 move downward, contacts the tubular diameter-reducing portion 104, and then is mounted thereon.

Moreover, in the above embodiment, the power generating apparatus 100 is installed in the collection tank 130. However, if the splashing of the liquid WK jetted from the rotating blade 120 is not a problem, the collection tank 130 is not required. In this case, it is possible to configure the power generating apparatus 100, omitting the collection tank 130.

Figure 8:
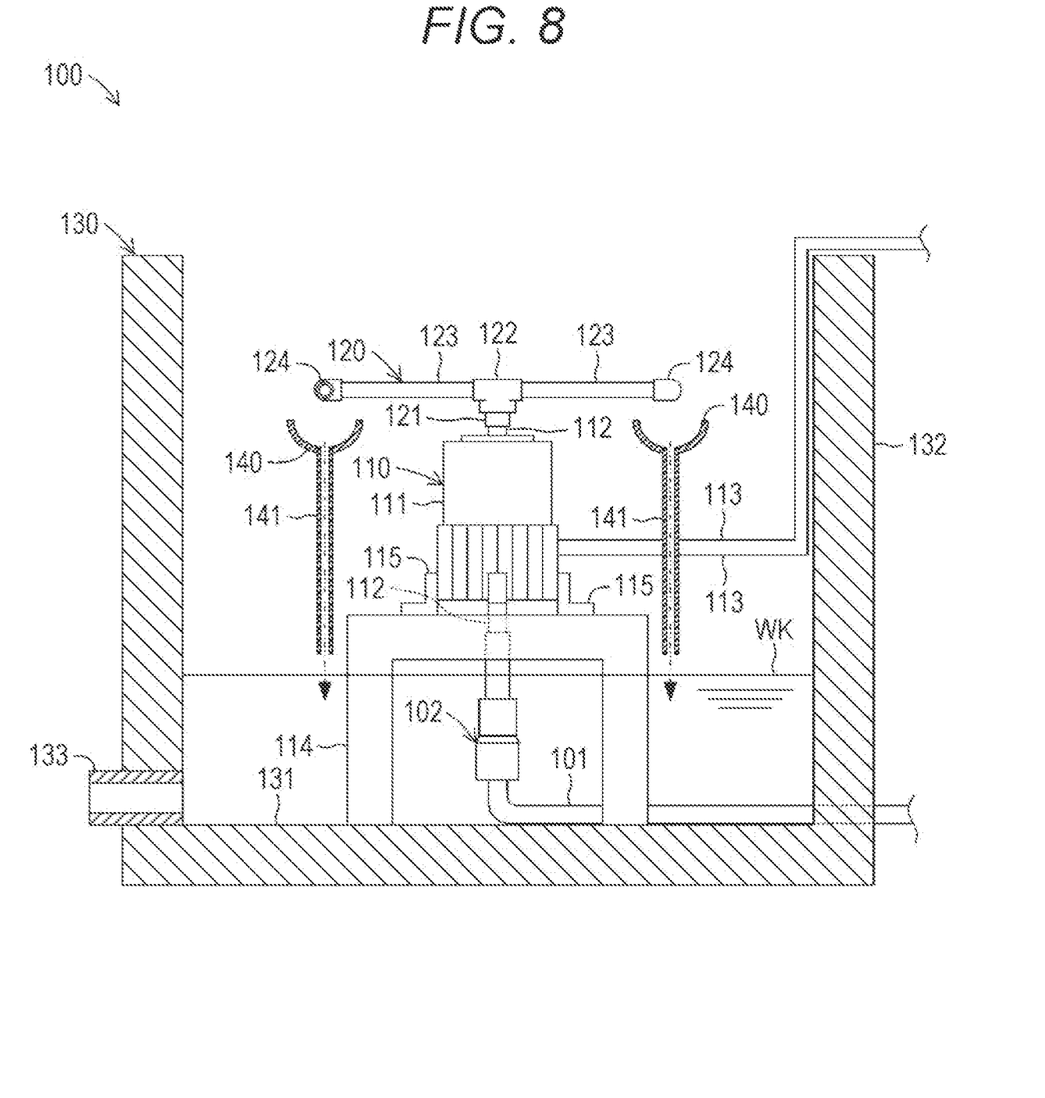
FIG. 8 is a cross-sectional view schematically illustrating a diagrammatic sketch of the external configuration of a power generating apparatus according to another modification of the present invention.
Figure 9:
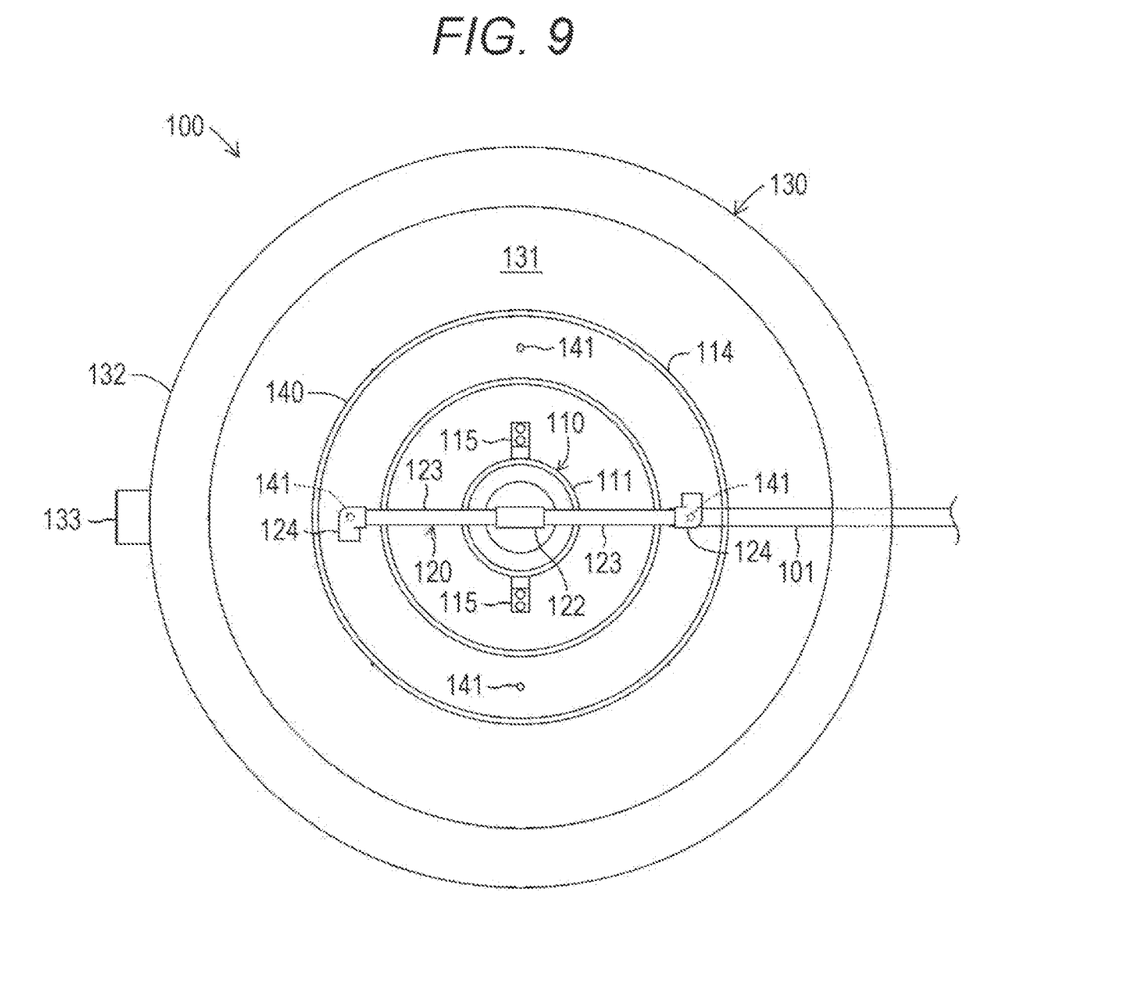
FIG. 9 is a plan view schematically illustrating a diagrammatic sketch of the external configuration of the power generating apparatus according to the other modification of the present invention illustrated in FIG. 8.

Moreover, the power generating apparatus 100 can also include a liquid jet receiver 140 that actively collects the liquid WK jetted from the rotating blade 120 as illustrated in FIGS. 8 and 9. The power generating apparatus 100 can be configured in such a manner that the liquid jet receiver 140 is formed into a gutter or groove shape extending annularly along a rotation path of the discharge tube 124 of the rotating blade 120 below the rotation path. In this case, a drain pipe 141 or unillustrated through-hole that guides the liquid WK collected in a bottom portion thereof downward (refer to a chain double-dashed line in FIG. 8) is formed in the liquid jet receiver 140. Moreover, the liquid jet receiver 140 is fixed by an unillustrated support to the bottom portion 131 or the side surface 132 of the collection tank 130. Consequently, the power generating apparatus 100 can collect the liquid WK at an early stage while preventing the liquid WK jetted from the rotating blade 120 from splashing. The collected liquid WK can be discarded or reused.

Moreover, in the above embodiment, water is used as the liquid WK in the power generating apparatus 100. However, naturally, a liquid other than water can also be used as the liquid WK in the power generating apparatus 100.

LIST OF REFERENCE SIGNS

WK Liquid
100 Power generating apparatus
101 Inlet pipe
102 Rotational coupling unit
103 Tubular diameter-increasing portion
103a Fitting portion
103b Inclined surface
103c Opposing portion
104 Tubular diameter-reducing portion
104a Fitting portion
104b Inclined surface
104c Outflow portion
105 Tubular water passage
110 Generator
111 Generator body
112 Input shaft
113 Output wiring
114 Support base
115 Fastener
120 Rotating blade
121 Base pipe
122 Branch tube
123 Arm pipe
124 Discharge tube
125 Branch tube
126 Base pipe
130 Collection tank
131 Bottom portion
132 Side surface
133 Drain pipe
134 Ceiling
140 Liquid jet receiver
141 Drain pipe

The invention claimed is:

1. A power generating apparatus comprising:
an inlet pipe configured to receive and convey a liquid;
a rotating blade including a base pipe constituted by a pipe body communicating with the inlet pipe, the rotating blade being configured to jet the liquid in a circumferential direction of the base pipe and rotate along the circumferential direction;
a generator including an input shaft where a rotary drive force is inputted, the input shaft configuring a water passage that guides the liquid supplied from the inlet pipe to the base pipe of the rotating blade, the generator being configured to convert the rotary drive force into electrical energy; and
a rotational coupling unit rotatably coupling the base pipe, directly or via the input shaft, to the inlet pipe, wherein
the input shaft is provided in such a manner as to penetrate the generator,
the generator generates electric power on the basis of the rotary drive of the base pipe connected to the input shaft,
the input shaft is connected at one end portion to the rotational coupling unit,
the input shaft is connected at the other end portion to the base pipe, and
the generator is placed between the rotational coupling unit and the rotating blade.

2. A power generating apparatus comprising:
an inlet pipe configured to receive and convey a liquid;
a rotating blade including a base pipe constituted by a pipe body communicating with the inlet pipe, the rotating blade being configured to jet the liquid in a circumferential direction of the base pipe and rotate along the circumferential direction;
a generator including an input shaft where a rotary drive force is inputted, the generator being configured to convert the rotary drive force into electrical energy; and
a rotational coupling unit rotatably coupling the base pipe, directly or via the input shaft, to the inlet pipe, wherein
the generator generates electric power on the basis of the rotary drive of the base pipe connected to the input shaft,
the rotational coupling unit includes:
 a tubular diameter-increasing portion formed into a tube that has an outside diameter increasing from a portion coupled to the base pipe or the input shaft toward a portion coupled to the inlet pipe;
 a tubular diameter-reducing portion formed into a tube that covers an outer peripheral surface of the tubular diameter-increasing portion via a tubular gap from the portion coupled to the inlet pipe and has a reducing inside diameter; and
 a tubular water passage constituted by the tubular gap between the outer peripheral surface of the tubular diameter-increasing portion and an inner peripheral surface of the tubular diameter-reducing portion, the tubular water passage being configured to communicate with an inside of the inlet pipe and an outside of the inlet pipe.

3. The power generating apparatus according to claim 2, wherein
the tubular diameter-increasing portion is configured, including an inclined surface having gradually increasing outside and inside diameters, and
the tubular diameter-increasing portion and the inlet pipe are formed in such a manner that distal end portions thereof are capable of coming into contact face-to-face with each other.

4. The power generating apparatus according to claim 3, wherein the rotating blade is configured in such a manner that an outlet through which the liquid is discharged is inclined toward the rotational coupling unit with respect to a surface of revolution of the rotating blade.

5. A power generating apparatus comprising:
an inlet pipe configured to receive and convey a liquid;
a rotating blade including a base pipe constituted by a pipe body communicating with the inlet pipe, the rotating blade being configured to jet the liquid in a circumferential direction of the base pipe and rotate along the circumferential direction;
a generator including an input shaft where a rotary drive force is inputted, the generator being configured to convert the rotary drive force into electrical energy; and
a rotational coupling unit rotatably coupling the base pipe, directly or via the input shaft, to the inlet pipe, wherein
the generator generates electric power on the basis of the rotary drive of the base pipe connected to the input shaft,
the rotating blade includes an arm pipe constituted by at least one pipe body extending in a radial direction of the base pipe, the arm pipe being configured to jet the liquid in the circumferential direction of the base pipe and rotate along the circumferential direction, and
a gutter- or groove-shaped liquid jet receiver extending annularly along a rotation path of the liquid jetted from the arm pipe below the rotation path is provided below the arm pipe.

* * * * *